United States Patent
Patil et al.

(10) Patent No.: US 8,638,711 B2
(45) Date of Patent: Jan. 28, 2014

(54) SYSTEMS AND METHODS OF MAINTAINING CORE NETWORK STATUS DURING SERVING RADIO NETWORK SUBSYSTEM RELOCATION

(75) Inventors: Kiran KishanRao Patil, Andhra Pradesh (IN); Liangchi Hsu, San Diego, CA (US); Rohit Kapoor, San Diego, CA (US); Sharad Deepak Sambhwani, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 12/853,937

(22) Filed: Aug. 10, 2010

(65) Prior Publication Data

US 2011/0038347 A1 Feb. 17, 2011

Related U.S. Application Data

(60) Provisional application No. 61/233,043, filed on Aug. 11, 2009.

(51) Int. Cl.
*H04B 7/185* (2006.01)
*H04W 4/00* (2009.01)

(52) U.S. Cl.
USPC .......................................... 370/318; 370/331

(58) Field of Classification Search
None
See application file for complete search history.

(56) References Cited

U.S. PATENT DOCUMENTS

| | | | |
|---|---|---|---|
| 7,471,957 B2 * | 12/2008 | Palkisto et al. | 455/458 |
| 2007/0036109 A1 | 2/2007 | Kwak et al. | |
| 2009/0042560 A1 * | 2/2009 | Islam et al. | 455/423 |
| 2009/0129339 A1 * | 5/2009 | Young et al. | 370/331 |
| 2009/0190550 A1 | 7/2009 | Giustina et al. | |
| 2009/0318199 A1 * | 12/2009 | Barreto et al. | 455/574 |
| 2010/0317345 A1 * | 12/2010 | Futaki et al. | 455/436 |

FOREIGN PATENT DOCUMENTS

| | | |
|---|---|---|
| EP | 1377096 A1 | 1/2004 |
| WO | 2009023497 A2 | 2/2009 |
| WO | WO2009062304 A1 | 5/2009 |

OTHER PUBLICATIONS

International Search Report and Written Opinion—PCT/US2010/045192, International Search Authority—European Patent Office—Nov. 5, 2010.
QUALCOMM Europe: "Syncup of fast dormant support between UE and network, during SRNS relocation using reconfiguration . . . signaling messages" 3GPP Draft; R2-094437-25.331-CRXXXX-(REL-8)-Fast_Dorma NCY-Support, 3rd Generation Partnership Project (3GPP), Mobile Competence Centre ; 650, Route Des Lucioles ; F-06921 Sophia-Antipolis Cedex ; France, No. Shenzhen, China; Aug. 17, 2009, XP050352895.

(Continued)

*Primary Examiner* — Eunsook Choi
(74) *Attorney, Agent, or Firm* — Charles E. Eggers

(57) ABSTRACT

A system and method enable wireless user equipment (UE) to undergo a serving radio network subsystem (SRNS) relocation to a radio network controller (RNC) that does not support a fast dormancy feature while maintaining synchronization with the packet-switched domain of the core network. The UE is made aware of whether the target RNC supports the fast dormancy feature by way of an indication provided to the UE in a reconfiguration message provided by the source RNC, that is, the RNC to which the UE was connected prior to the SRNS relocation. In this way, the UE can behave accordingly whether or not the target RNC supports the fast dormancy feature.

28 Claims, 7 Drawing Sheets

(56) References Cited

OTHER PUBLICATIONS

Vodafone et al: "UE a Fast DormancyA Behaviour" 3GPP Draft; R2-075251, 3rd Generation Partnership Project (3GPP), Mobile Competence Centre ; 650, Route Des Lucioles ; F-06921 Sophia-Antipolis Cedex ; France, vol. RAN WG2, No. Jeju; Nov. 12, 2007, XP050137675.

* cited by examiner

SYSTEMS AND METHODS OF MAINTAINING CORE NETWORK STATUS DURING SERVING RADIO NETWORK SUBSYSTEM RELOCATION

CROSS-REFERENCE TO RELATED APPLICATION(S)

This application claims the benefit of U.S. Provisional Patent Application No. 61/233,043, titled "SYSTEMS AND METHODS OF MAINTAINING CORE NETWORK STATUS DURING SERVING RADIO NETWORK SUBSYSTEM RELOCATION," filed on Aug. 11, 2009, the disclosure of which is expressly incorporated by reference herein in its entirety.

BACKGROUND

1. Field

Aspects of the present disclosure relate generally to wireless communication systems, and more particularly, to techniques for improving battery life in wireless mobile devices by enabling them to enter a dormant or idle mode.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division— Code Division Multiple Access (TD-CDMA), and Time Division—Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method of wireless communication includes receiving a notification to relocate from a source serving radio network subsystem (SRNS) to a target SRNS and determining whether a target radio network controller (RNC) corresponding to the target SRNS supports a fast dormancy feature. If the target RNC supports the fast dormancy feature, the user equipment (UE) may enter a dormant state, power saving state, or idle state to save battery life.

In an aspect of the disclosure, an apparatus of wireless communication includes means for receiving a notification to relocate from a source SRNS to a target SRNS, and means for determining whether a target RNC corresponding to the target SRNS supports a fast dormancy feature. If the target RNC supports the fast dormancy feature, the UE includes means for entering a dormant state, power saving state, or idle state to save battery life.

In an aspect of the disclosure, a computer program product includes a computer-readable medium having code for receiving a notification to relocate from a source SRNS to a target SRNS, and for determining whether a target RNC corresponding to the target SRNS supports a fast dormancy feature. If the target RNC supports the fast dormancy feature, the computer-readable medium has code for entering a dormant state, power saving state, or idle state.

In an aspect of the disclosure, an apparatus for wireless communication includes at least one processor and a memory coupled to the at least one processor. Here, the at least one processor is configured to receive a notification to relocate from a source SRNS to a target SRNS, and to determine whether a target RNC corresponding to the target SRNS supports a fast dormancy feature. If the target RNC supports the fast dormancy feature, the processor is configured to enter a dormant state power saving state, or idle state.

These and other aspects of the invention will become more fully understood upon a review of the detailed description, which follows.

DETAILED DESCRIPTION

Figure 1:
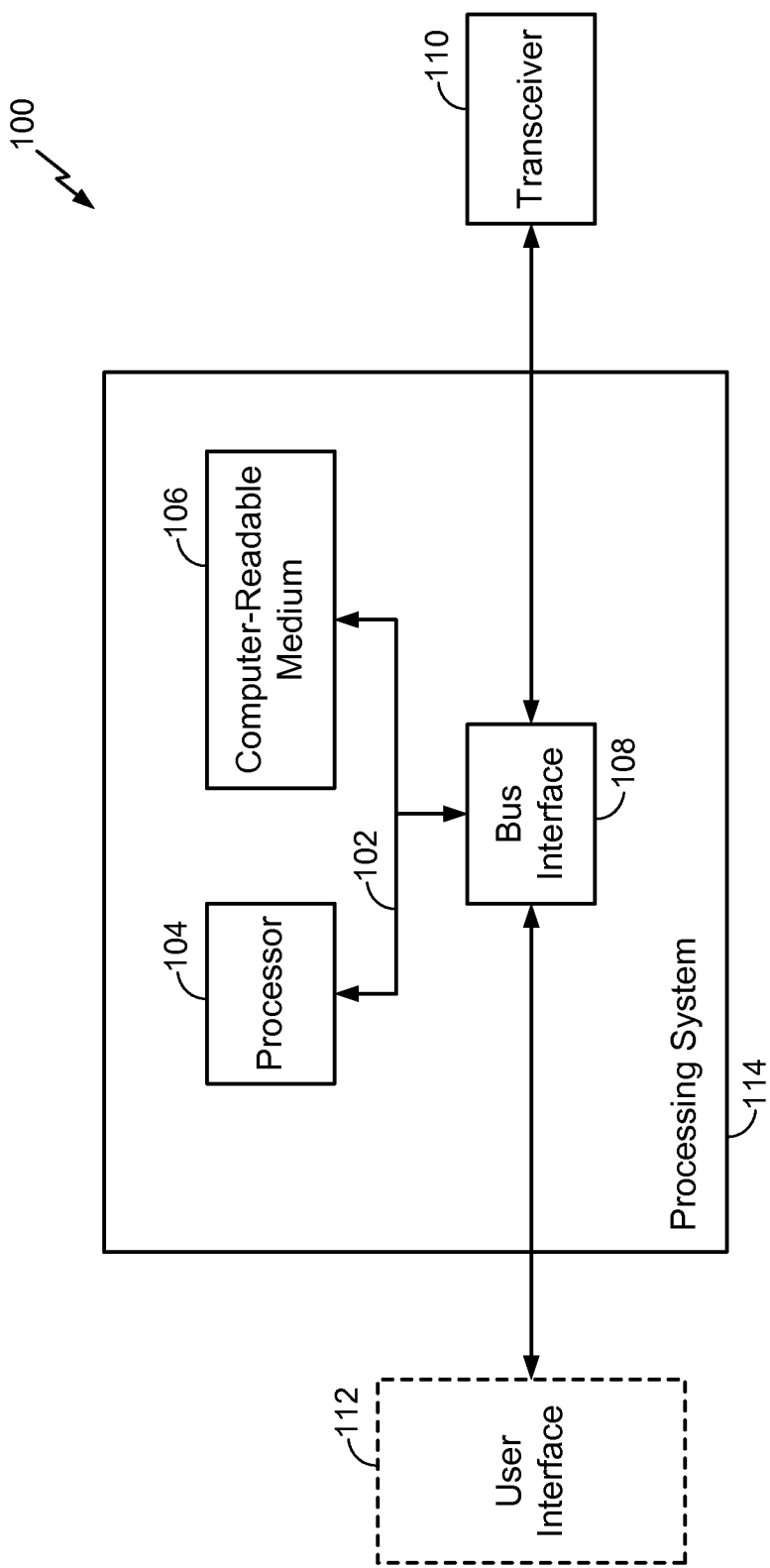
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
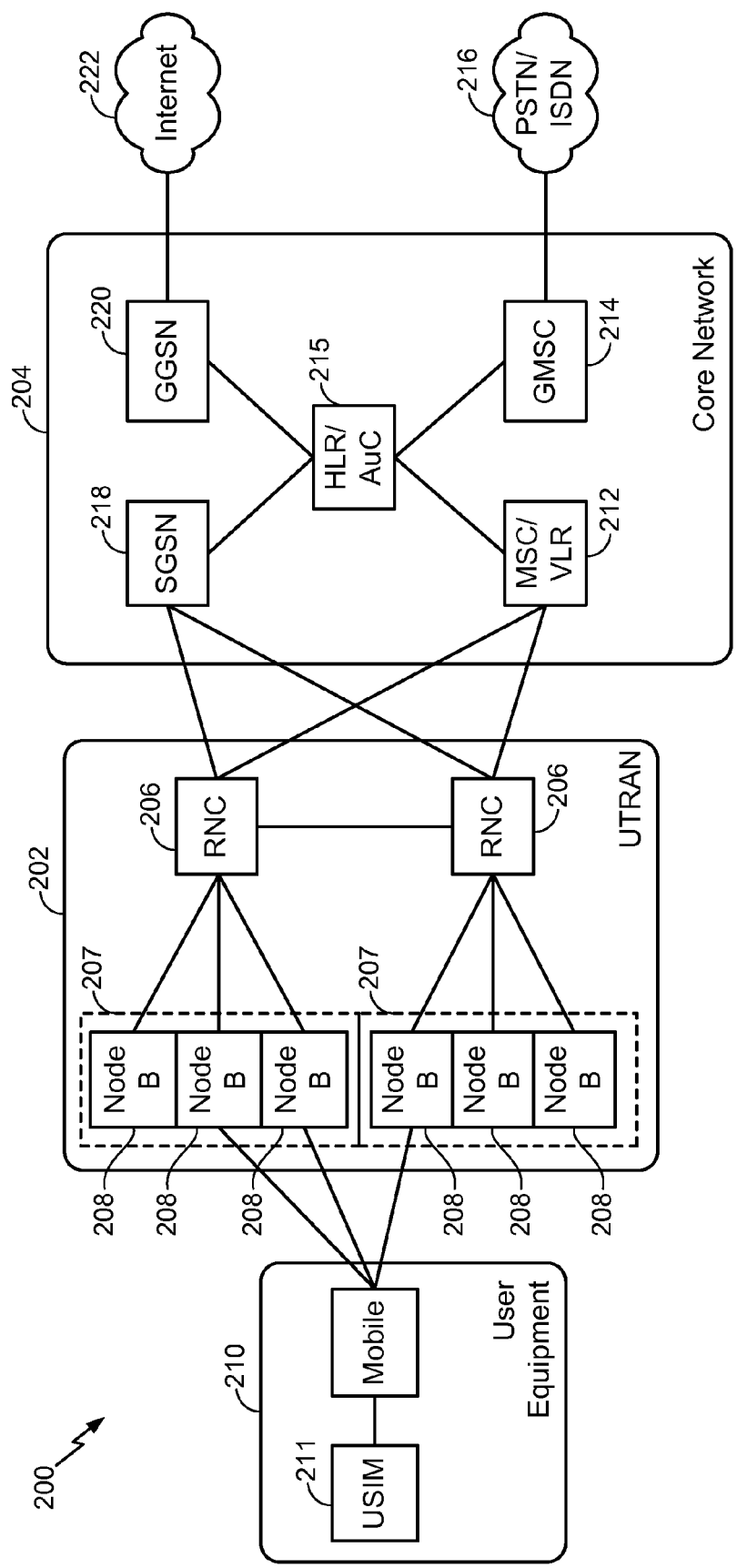
FIG. 2 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 2 are presented with reference to a UMTS system 200 employing a W-CDMA air interface. A UMTS network includes three interacting domains: a Core Network (CN) 204, a UTRAN 202, and UE 210. In this example, the UTRAN 202 provides various wireless services including telephony, video, data, messaging, broadcasts, and/or other services. The UTRAN 202 may include a plurality of Serving Radio Network Subsystems (SRNSs) such as an SRNSs 207, each controlled by a respective Radio Network Controller (RNC) such as an RNC 206. Here, the UTRAN 202 may include any number of RNCs 206 and SRNSs 207 in addition to the RNCs 206 and SRNSs 207 illustrated herein. The RNC 206 is an apparatus responsible for, among other things, assigning, reconfiguring and releasing radio resources within the SRNS 207. The RNC 206 may be interconnected to other RNCs (not shown) in the UTRAN 202 through various types of interfaces such as a direct physical connection, a virtual network, or the like, using any suitable transport network.

The geographic region covered by the SRNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each SRNS 207; however, the SRNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The CN domain 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The core network 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard GSM circuit-switched data services. The GGSN 220 provides a connection for the RAN 202 to a packet-based network 222. The packet-based network 222 may be the Internet, a private data network, or some other suitable packet-based network. The primary function of the GGSN 220 is to provide the UEs 210 with packet-based network connectivity. Data packets are transferred between the GGSN 220 and the UEs 210 through the SGSN 218, which performs primarily the same functions in the packet-based domain as the MSC 212 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The W-CDMA air interface is based on such direct sequence spread spectrum technology and additionally calls for a frequency division duplexing (FDD). FDD uses a different carrier frequency for the UL and DL between a Node B 208 and a UE 210.

Figure 3:
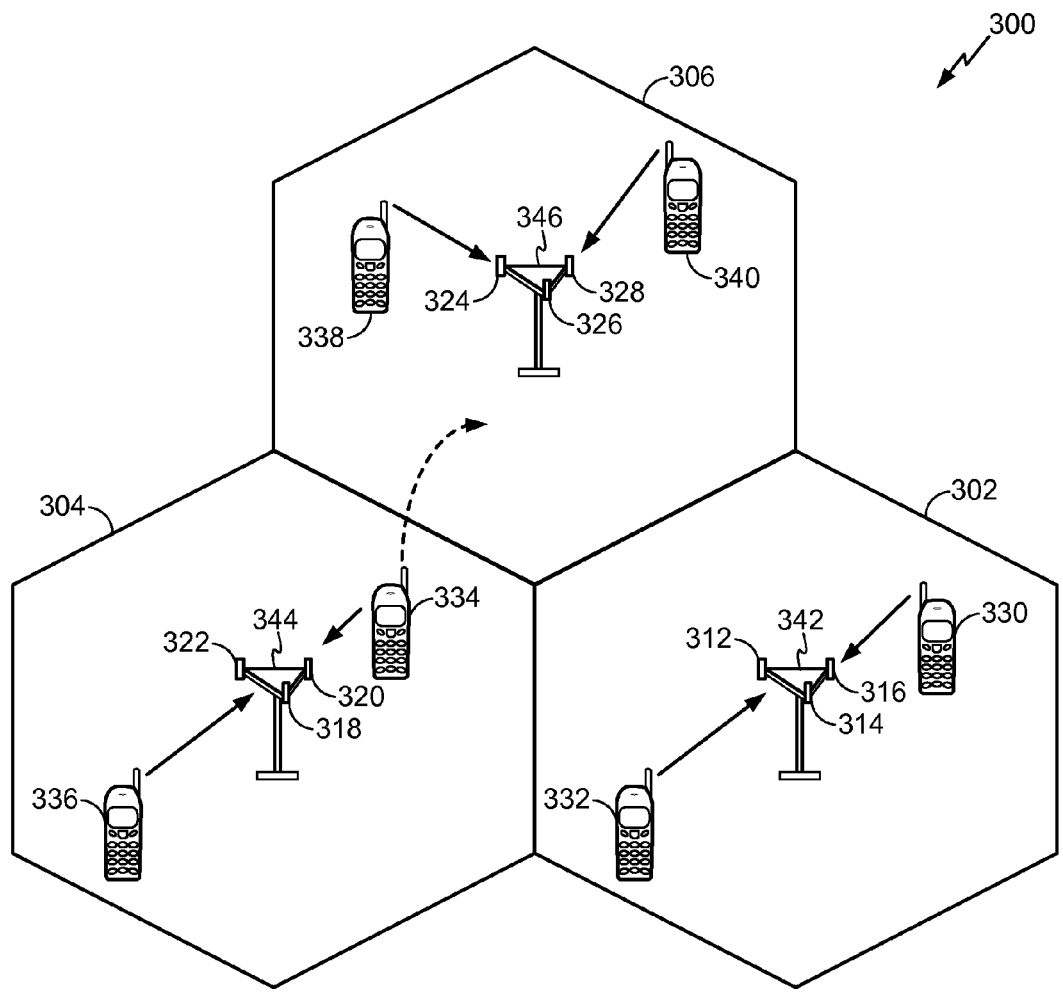
FIG. 3 is a conceptual diagram illustrating an example of an access network.

Referring to FIG. 3, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a core network 204 (see FIG. 2) for all the UEs 330, 332, 334, 336, 338, 340 in the respective cells 302, 304, and 306.

In one example, the UMTS signaling protocol stack may be divided into Access Stratum (AS) and Non-Access Stratum (NAS). The NAS is a functional layer between the UE and the core network, managing functions and services that are independent from the access technology. The AS supports the NAS by managing functions and protocols for the transport of information across the UTRAN (UMTS Terrestrial Access Network) and air interface.

The NAS may include a Connection Management unit for handling circuit-switched calls, and may include sublayers responsible for call control (e.g., establish, release), supplementary services (e.g., call forwarding, 3-way calling), and short message service (SMS). The NAS may further include a Session Management unit for handling packet-switched calls (e.g., establish, release). The NAS may further include a Mobility Management module for handling location updating and authentication for circuit-switched calls. The NAS may further include a GPRS mobility management unit for handling location updating and authentication for packet-switched calls.

Likewise, the AS may include a Radio Resource Control (RRC) unit having protocols that are defined between the UE and RNC to handle establishment, release, and configuration of radio resources. The AS may further include a Radio Link Control (RLC) unit having protocols that are defined between the UE and RNC to provide segmentation, re-assembly, duplicate detection, and other traditional Layer 2 functions. The AS may further include a Medium Access Control (MAC) unit having protocols that are defined between UE and RNC to multiplex user plane and control plane data. The AS may further include a Physical Layer unit having protocols that are defined between the UE and Node B to transfer data over the radio link. The interface between UE and RNC at the Physical Layer handles macrodiversity combining and splitting functions.

Moreover, the NAS may employ services provided by the RRC (i.e., the upper layer of the AS), such as an initial direct transfer procedure, a downlink direct transfer procedure, and an uplink transfer procedure. Here, the initial direct transfer procedure may be used to establish a signaling connection. It may also be used to carry the initial higher layer (NAS) messages over the radio interface. The downlink direct transfer procedure may be used in the downlink direction to carry NAS messages over the radio interface. The uplink direct transfer procedure may be used in the uplink direction to carry NAS messages over the radio interface belonging to a signaling connection. For the downlink direct transfer procedure & uplink direct transfer procedure to work, a signaling connection, which may be established at the initial direct transfer procedure, may be maintained at the RRC until it is not explicitly requested to close by the NAS. Certain portions of the instant disclosure will utilize protocols and terminology specific to 3GPP TS 25.331, v9.1.0 ("Radio Resource Control (RRC) Protocol Specification"), incorporated by reference herein in its entirety, in order to provide improved clarity of the details described herein. However, those skilled in the art will comprehend that other protocols and standards may be utilized.

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The Node B (e.g., 342) may have multiple antennas supporting MIMO technology. The use of MIMO technology enables the Node B 342 to exploit the spatial domain to support spatial multiplexing, beamforming, and transmit diversity.

Spatial multiplexing may be used to transmit different streams of data simultaneously on the same frequency. The data steams may be transmitted to a single UE (e.g., 330) to increase the data rate or to multiple UEs (e.g., 330, 332) to increase the overall system capacity. This is achieved by spatially precoding each data stream and then transmitting each spatially precoded stream through a different transmit antenna on the downlink. The spatially precoded data streams arrive at the UE(s) 330, 332 with different spatial signatures, which enables each of the UE(s) 330, 332 to recover the one or more the data streams destined for that UE 330, 332. On the uplink, each UE 330 transmits a spatially precoded data stream, which enables the Node B 342 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Figure 4:
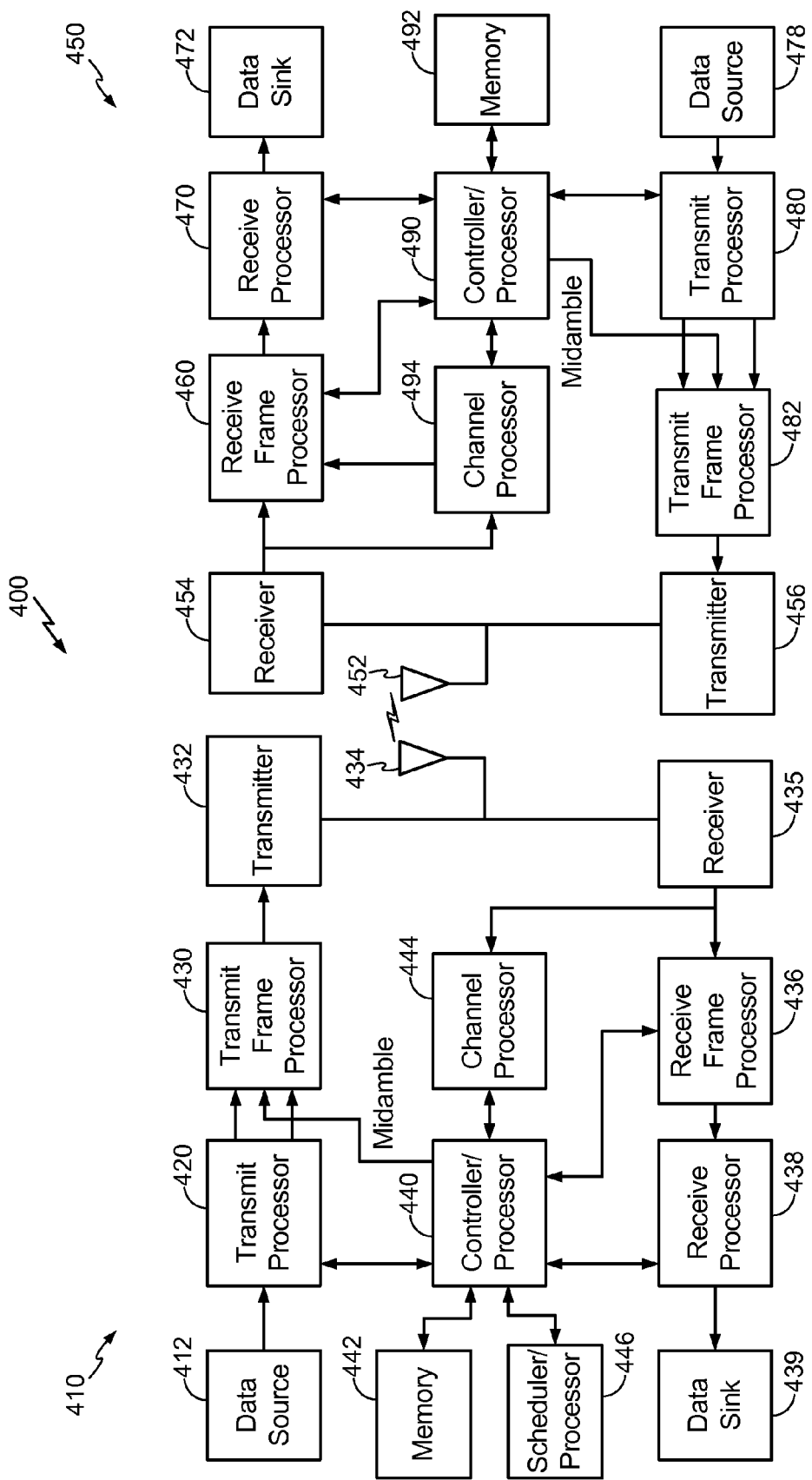
FIG. 4 is a block diagram conceptually illustrating an example of a Node B in communication with a UE in a telecommunications system.

FIG. 4 is a block diagram of a Node B 410 in communication with a UE 450 in a RAN 400, where the RAN 400 may be the RAN 202 in FIG. 2, the Node B 410 may be the Node B 208 in FIG. 2, and the UE 450 may be the UE 210 in FIG. 2. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback contained in the midamble 214 (FIG. 2) from the UE 450. The symbols generated by the transmit processor 420 are provided to a transmit frame processor 430 to create a frame structure. The transmit frame processor 430 creates this frame structure by multiplexing the symbols with a midamble 214 (FIG. 2) from the controller/processor 440, resulting in a series of frames. The frames are then provided to a transmitter 432, which provides various signal conditioning functions including amplifying, filtering, and modulating the frames onto a carrier for downlink transmission over the wireless medium through smart antennas 434. The smart antennas 434 may be implemented with beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides the midamble 214 (FIG. 2) to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with a midamble 214 (FIG. 2) from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides the midamble 214 (FIG. 2) to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

Fast dormancy is a feature for packet data users, generally supported by an RNC, which enables a substantial reduction in the amount of time that a UE is required to remain in an active state, thus improving battery life. For example, live field test results indicate an improvement in standby time of over 100% on a UMTS device utilizing fast dormancy to send the UE to idle in existing networks. Fast dormancy additionally releases radio resources not being used and moves the UE to an idle mode or a so-called "URA_PCH" state (defined in the 3GPP RRC protocol specification) so that the network may free up extra capacity that may be utilized for other users.

In certain applications, although a UE may have completed its data transfer and not expect further data exchange, the UE must wait for the network to move it from the CELL_DCH or CELL_FACH state to the idle mode or to the CELL_PCH or URA_PCH state (each of these states is also defined in the 3GPP RRC protocol specification). This is because the network may not know whether the UE has more data to transfer, and therefore may keep the UE in these data transfer states for a much longer period than necessary. The network does this to avoid an additional setup delay for subsequent packet data transfers, in the event that there are in fact more data packets to transfer.

In general, because a network may not be capable to anticipate the data transfer characteristics of particular applications, this scenario may lead to excessive battery drain. That is, the UE's application layer generally autonomously determines whether it has any more data to exchange. By using application layer acknowledgement (for the data transfer) and application specific inactivity timers, the UE is able to determine reliably when it is appropriate to send an indication to the network indicating that the UE no longer needs this signaling connection, as data transfer is complete, by including a cause value indicating the end of the data transfer session. Here, the fast dormancy feature allows the UE to send this indication to the network in an RRC Signaling Connection Release Indication (SCRI) message. In this way, the network can make an informed decision about how to handle this UE. That is, the network may decide to release the signaling connection, in which case it may then decide to release the RRC connection and let the UE become idle. Alternatively, it may keep the UE in the CELL_PCH or URA_PCH state in order to achieve similar battery savings while ensuring a quicker reconfiguration for data transfer in the more distant future. Such behavior is described as fast dormancy, as the UE moves from active data transfer to idle much faster than traditionally waiting for inefficient inactivity timers to expire.

Figure 5:
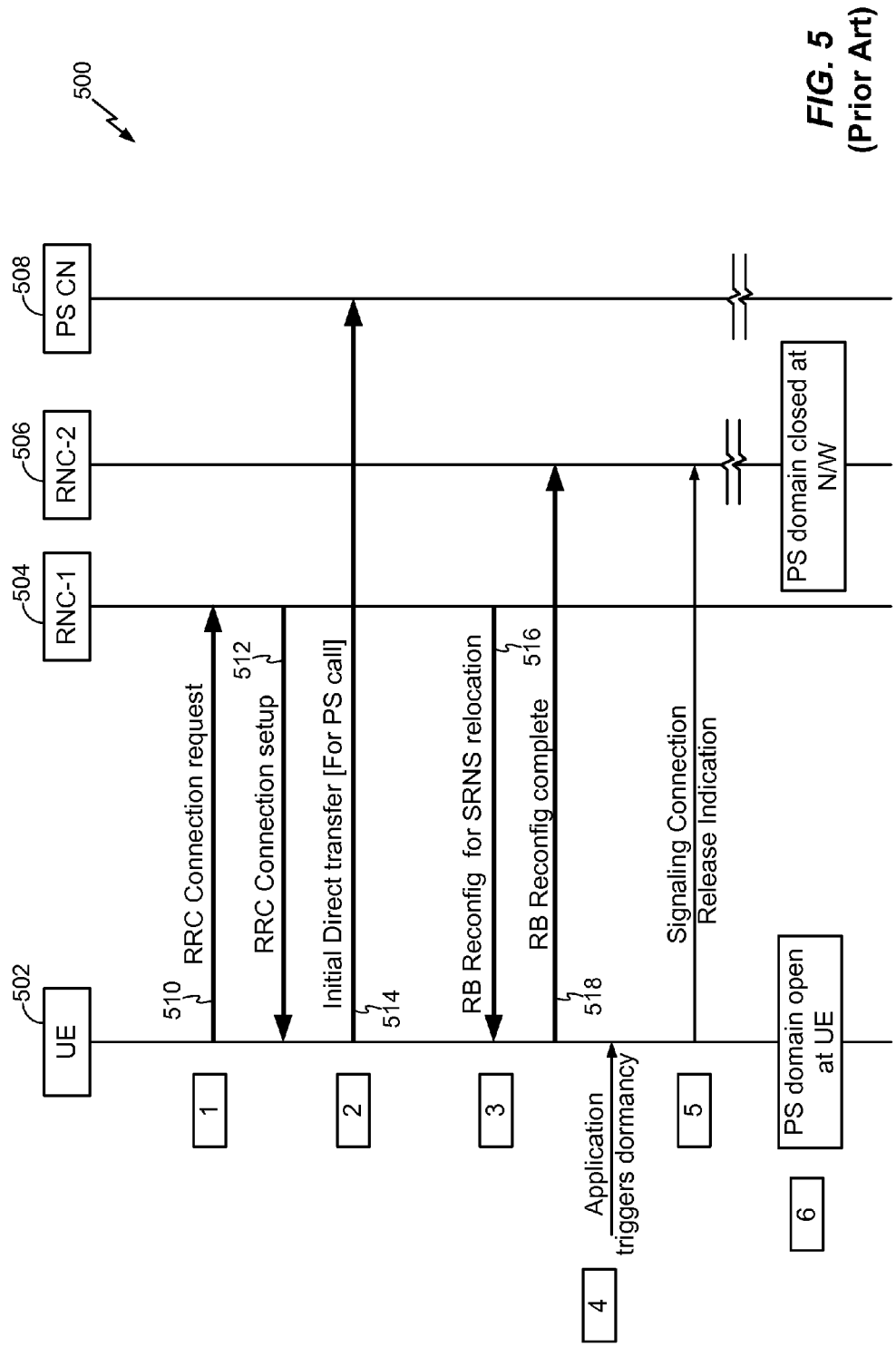
FIG. 5 is a call flow diagram conceptually illustrating a UE and an RNC that does not support a fast dormancy feature going out of sync in the prior art.

FIG. 5 is a call flow diagram 500 illustrating an issue with a prior art procedure for relocating a UE 502 from a source RNC (RNC-1) 504, which supports a fast dormancy feature, to a target RNC (RNC-2) 506, which does not support the fast dormancy feature. That is, in this scenario, the UE 502 and the target RNC 506 may lose synchronization with regard to the core network domain status. In the process shown in FIG. 5, five sequential phases are designated with the numbers 1-5 on the left-hand side of the illustration, where time moves forward in a downward direction according to the illustration. Although the illustration shows communication occurring directly between the UE and the RNCs or the PS domain of the CN, those skilled in the art will comprehend that these arrows represent higher-layer communication that relies on lower-layer communication between other entities such as a NodeB, etc.

In phase 1, the UE 502 establishes an RRC connection with RNC-1 504. Here, the UE 502 provides an RRC connection request message 510 to the RNC-1 404, for example, utilizing the uplink CCCH, including an initial UE identity and an establishment cause value, with a domain indicator set to indicate the PS-domain. The RNC-1 404 may then respond with an RRC connection setup message 512, for example, utilizing the downlink CCCH, including the parameters needed to establish packet-switched communication. In phase 2, with RRC connection setup being complete, the UE 502 provides an initial direct transfer 514 to initiate a packet-switched call to the packet-switched domain of the core network 508.

In phase 3, radio bearer (RB) reconfiguration message 516 is sent from the source RNC 504 to the UE 502, including an instruction for the UE 502 to relocate from a source SRNS, serviced by the source RNC (RNC-1) 504, to a target SRNS, serviced by the target RNC (RNC-2) 506. This reconfiguration/relocation may be requested due to a change in QoS, due to differences in services available at the two SRNSs, or for any other suitable reason. In various examples, a relocation procedure may be requested as a portion of any one or more of the following RRC reconfiguration messages from the source RNC 504: RADIO BEARER RECONFIGURATION (as illustrated, 516), PHYSICAL CHANNEL RECONFIGURATION, RADIO BEARER RELEASE, RADIO BEARER SETUP, TRANSPORT CHANNEL RECONFIGURATION, CELL UPDATE CONFIRM, URA UPDATE CONFIRM, etc. Upon reconfiguration of the radio bearer and relocation of the UE 502 to the SRNS serviced by the target RNC 506, the UE 502 may provide a RB reconfiguration complete message 518 to the target RNC 506 indicating that the reconfiguration has been done.

In phase 4, an application/entity in the UE 502 may become idle when no data traffic is exchanged between the UE 502 and the RNC 506. Accordingly, this state of no data exchange may be noticed at the UE 502, in which case the application may turn down an active state and trigger a dormant state, power saving state, or idle state (e.g., to save battery life). Accordingly, an indicator such as a message may be sent from the radio resource control layer in the UE 502 to the RNC 506.

In phase 5, the UE 502 provides a signaling connection release indication (SCRI) message 520. The SCRI message 520 may be used by the UE 502 to request for the network to initiate a state transition to a dormant, idle, or essentially any battery efficient RRC state such as CELL_PCH or URA_PCH. Unfortunately, as described, a radio link failure occurs thereafter with respect to the RNC 506 because the RNC 506 does not support the fast dormancy feature. Thus, the UE 502 and the RNC 506 become out of sync after to the relocation, and at phase 6, the behavior in the UE 502 becomes unknown to the network. That is, the PS domain of the core network 508 is open with respect to the UE 502, and yet is closed with respect to the RNC 506. Current information in messaging as described below does not address such issues.

For example, a timer T323 may be kept in the UE 502, as well as in the RNC 506. Here, the timer T323 may be a timer for managing the release of a signaling connection and termination of a packet-switched data session. Those skilled in the art will be familiar with the timer T323 as defined in the UMTS RRC protocol specification TS 25.331. In a legacy RNC that does not support fast dormancy, expiry of the timer T323 may be utilized to trigger a low-power mode in the UE and a release of radio resources assigned to that UE. Prior to phase 3 in FIG. 5, that is, prior to radio bearer relocation, the UE retains a valid value of the timer T323 stored in an information element (IE) called "UE Timers and constants in connected mode" in the variable TIMERS_AND_CONSTANTS of system information block (SIB) type 1. In phase 4 of FIG. 5, that is, after radio bearer relocation, when the application triggers the fast dormancy feature, the UE 502 will still be under the impression that the "new" cell, corresponding to RNC-2 506, is capable of the fast dormancy feature, while in reality, it is not.

That is, in order to indicate the fast dormancy feature the UE 502 conventionally re-uses an existing RRC message called the signaling connection release indication (SCRI) with a new cause. However, the UE 502 generally does not close the packet-switched domain of the core network 508 from the ESTABLISHED_SIGNALING_CONNECTIONS (that is, a variable used to store information about established signaling connections including a signaling connection list).

On the other hand, the SCRI message and procedure is conventionally utilized by the UE 502 to indicate to the UTRAN that one of its signaling connections has been released. This procedure may in turn initiate an RRC connection release procedure. Thus, when the RNC (RNC-2) 506 does not support the fast dormancy feature, it fails to recognize the different cause of the SCRI message, and may release the connection with the packet-switched domain of the core network 508.

Hence, it is seen that the UE 502 and the RNC 506 conventionally go out of sync with respect to the packet-switched domain open status as a consequence of the relocation from the RNC-1 504, which supports the fast dormancy feature, to the RNC-2 506, which does not support the fast dormancy feature. Subsequent packet-switched calls or packet-switched signaling messages from the UE 502 may then be dropped by the network, breaking the NAS layer functionality.

Thus, in an aspect of the instant disclosure, an open status of a packet-switched domain of a core network is synchronized at a UE and at an RNC when SRNS relocation occurs while a fast dormancy feature is active. In one example, at any SRNS relocation, the UE may always assume that the target RNC does not support the fast dormancy feature, and thus, the UE may disable the fast dormancy feature at the SRNS relocation. In this way, although the UE does not know whether the new RNC supports this feature, the potential loss of synchronization may be avoided. However, the drawback to this approach is the disabling of the fast dormancy feature even in a scenario where it may have been supported, whereby the UE would not indicate to the target RNC that it does not have any data to send in the uplink, resulting in a shortened battery life at the UE.

In another approach according to the instant disclosure, the status of the packet-switched domain of the core network may be synchronized by exchanging reconfiguration messages between the UE and the target RNC, wherein timers are employed to preserve UE/network synchronization, and while a UE application has triggered UE dormancy. In one example, the timer T323 value may be carried in the reconfiguration messages in a way to support synchronization.

In one aspect of the disclosure, each type of reconfiguration message (e.g., the messages RADIO BEARER RECONFIGURATION, PHYSICAL CHANNEL RECONFIGURATION, RADIO BEARER RELEASE, RADIO BEARER SETUP, TRANSPORT CHANNEL RECONFIGURATION, CELL UPDATE CONFIRM, and URA UPDATE CONFIRM) sent from an RNC to the UE may carry an information element (IE) corresponding to the timer T323 value when a network supports the fast dormancy feature. In this way, in the case of an SRNS relocation, a source RNC 504 may communicate to a UE 502 that a target RNC 506 to which the UE 502 is to relocate does or does not support the fast dormancy feature. Here, the source RNC 504 and the target RNC 506 may include a communication interface on a backhaul connection, e.g., being a direct link between the target and source RNCs, or a connection through an intermediary, for example, in the core network. However, because some reconfiguration messages from an RNC are utilized by the network to change various configurations within the same cell, some of the IEs corresponding to the timer T323 value will be unnecessarily broadcasted over the air interface when the network supports the fast dormancy feature. This approach may therefore increase the overhead of the number of bits transmitted over the air interface and may require backhaul communications between RNCs.

In another aspect of the disclosure, when the network supports the fast dormancy feature, each type of reconfiguration message sent from an RNC to the UE may carry an IE corresponding to the timer T323 value when the timer T323 value has changed; when the timer T323 value has not changed, but the network supports the fast dormancy feature, each type of reconfiguration message may carry a simple indication, such as a single bit, to indicate that the network supports the fast dormancy feature. In this way, the amount of air transmission overhead may be reduced when compared to the transmission of the IE corresponding to the timer T323 value. However, once again, because reconfiguration messages are utilized by the network for various types of reconfiguration within the same cell, unnecessary overhead still may occur when the T323 value has changed even though a SRNS relocation is not being requested.

In another aspect of the disclosure, reconfiguration messages that are requesting an SRNS relocation to a target RNC that supports the fast dormancy feature may carry the IE corresponding to the timer T323 value when the timer T323 value has changed; when the timer T323 value is unchanged but the target RNC supports the fast dormancy feature the reconfiguration message may include a simple indication such as a single bit to indicate that the target RNC supports the fast dormancy feature. In this way, the unnecessary overhead in broadcasting the IE corresponding to the timer T323 value in each reconfiguration message (i.e., those messages even where an SRNS relocation is not being requested) can be substantially reduced. Moreover, even in a case where an SRNS relocation is being requested, the air transmission overhead can be reduced when the timer T323 value is unchanged, by virtue of the transmission only of the simple indication instead of the IE corresponding to the timer T323 value. However, in order to determine whether the timer T323 value is unchanged, and thus, to determine whether to transmit the IE corresponding to the timer T323 value or the simple indication to indicate that the target RNC supports the fast dormancy feature, the source RNC 504 and the target RNC 506 may require communication of the timer T323 value over a backhaul connection. This communication of the timer T323 value may be difficult to implement in existing networks.

In another aspect of the disclosure, reconfiguration messages that are requesting an SRNS relocation to a target RNC that supports the fast dormancy feature may carry the IE corresponding to the timer T323 value. Here, the UE may interpret the presence of the IE corresponding to the timer T323 value as an indication that the target RNC to which an SRNS relocation is to take place supports the fast dormancy feature. That is, if a reconfiguration message that is requesting an SRNS relocation does not include the IE corresponding to the timer T323 value, then the UE will understand this as an indication that the target RNC to which the SRNS relocation is to take place does not support the fast dormancy feature. In this case, the UE may handle signaling with the target RNC following the SRNS relocation as a legacy RNC, and may properly maintain synchronization as to the status of the packet-switched domain of the core network. According to this aspect of the disclosure, coordination among RNCs as to the value of the timer T323 is not required.

Figure 6:
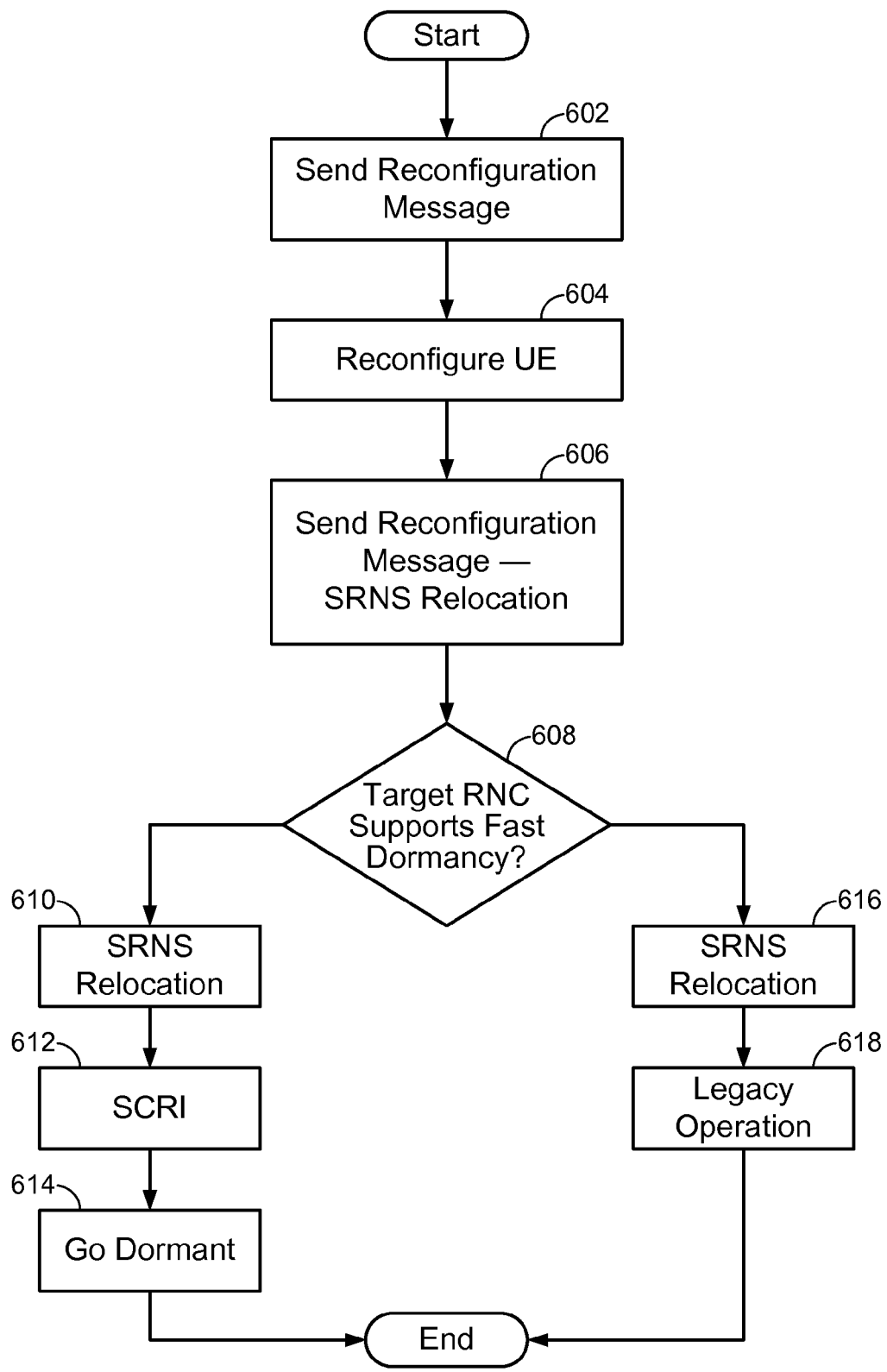
FIG. 6 is a flow chart illustrating a process of maintaining synchronization between a UE and an RNC after an SRNS relocation whether the RNC supports the fast dormancy feature or not.

FIG. 6 is a flow chart illustrating a process of relocating a UE from a source RNC to a target RNC according to an aspect of the instant disclosure. In some aspects of the disclosure, the process may be performed by circuitry or a processor as illustrated in FIG. 1. In some aspects of the disclosure the process may be performed by a combination of a plurality of RNCs 206 and a UE 210 as illustrated in FIG. 2. In some aspects of the disclosure portions of the process may be performed by the UE 450 of FIG. 4. In some aspects of the disclosure, the process may be performed by the UE and RNC illustrated in FIG. 7, described below. In block 602, the process sends a first reconfiguration message from a first RNC to a UE. Here, the first reconfiguration message is utilized by the network to change a configuration of the UE without relocating the UE. For example, the first reconfiguration message may be a PHYSICAL CHANNEL RECONFIGURATION message. In block 604, the process reconfigures the UE responsive to the first reconfiguration message.

In block 606, the process sends a second reconfiguration message from the first RNC to the UE. Here, the second reconfiguration message includes a notification for the UE that it is to undergo an SRNS relocation from a first SRNS corresponding to the first RNC, to a second SRNS corresponding to a second (target) RNC. For example, as illustrated in FIG. 5, the second reconfiguration message may be a RADIO BEARER RECONFIGURATION message. However, as discussed above other reconfiguration messages may include the notification for the UE that it is to undergo the SRNS relocation.

In block 608, the process determines at the UE whether the second, target RNC corresponding to the target SRNS supports a fast dormancy feature. Here, the UE may determine whether the target RNC supports the fast dormancy feature by looking for an indicator within the second reconfiguration message received from the first, source RNC, that the target RNC supports the fast dormancy feature. As discussed above, the indicator may be a single bit within the second reconfiguration message designated for this purpose; the indicator may be an information element corresponding to the timer T323 value; or any other suitable indicator for indicating that the target RNC supports the fast dormancy feature. If the second reconfiguration message indicates that the target RNC supports the fast dormancy feature, then the process moves to block 610; otherwise, if the second reconfiguration message does not indicate that the target RNC supports the fast dormancy feature, then the process moves to block 616.

In block 610, the process performs an SRNS relocation, wherein the UE undergoes a relocation from the source SRNS corresponding to the source RNC, to the target SRNS corresponding to the target RNC. Because the target RNC supports the fast dormancy feature, and the UE is aware of this situation due to the notification received by the UE in the second reconfiguration message, the UE may enter a dormant state when it is determined that there is an absence of data to transfer from the UE to the network. For example, as described above, an application or entity in the UE may detect this condition and trigger the dormant state, such as an idle state in the UE. In this case, the process moves to block 612, wherein the UE provides an SCRI message including an indication that the UE will enter the dormant state to the second, target RNC. Then, in block 614, the UE enters the dormant state, such as the idle state, the CELL_PCH or URA_PCH state, or any suitable battery-saving state. The process then ends.

Returning to block 616, the process has determined in block 608 that the target RNC does not support the fast dormancy feature, that is, the target RNC may be a legacy RNC. Thus, in block 616, the process relocates the UE from the source RNC to the target RNC as instructed. However, in block 618, the process undergoes legacy operation of the UE and target RNC, without utilizing the fast dormancy feature. For example, with legacy operation, when the target RNC receives an SCRI message from the UE, if the IE "Signaling Connection Release Indication Cause" is not included in the SCRI message, the target RNC may request the release of the signaling connection. On the other hand, if the IE "Signaling Connection Release Indication Cause" is included in the SCRI message from the UE, the target RNC may initiate a state transition to the efficient battery consumption IDLE, CELL_PCH, URA_PCH or CELL_FACH state. In this way, the UE maintains synchronization with the packet-switched core network even though an SRNS relocation has taken place to an RNC that does not support the fast dormancy feature.

Figure 7:
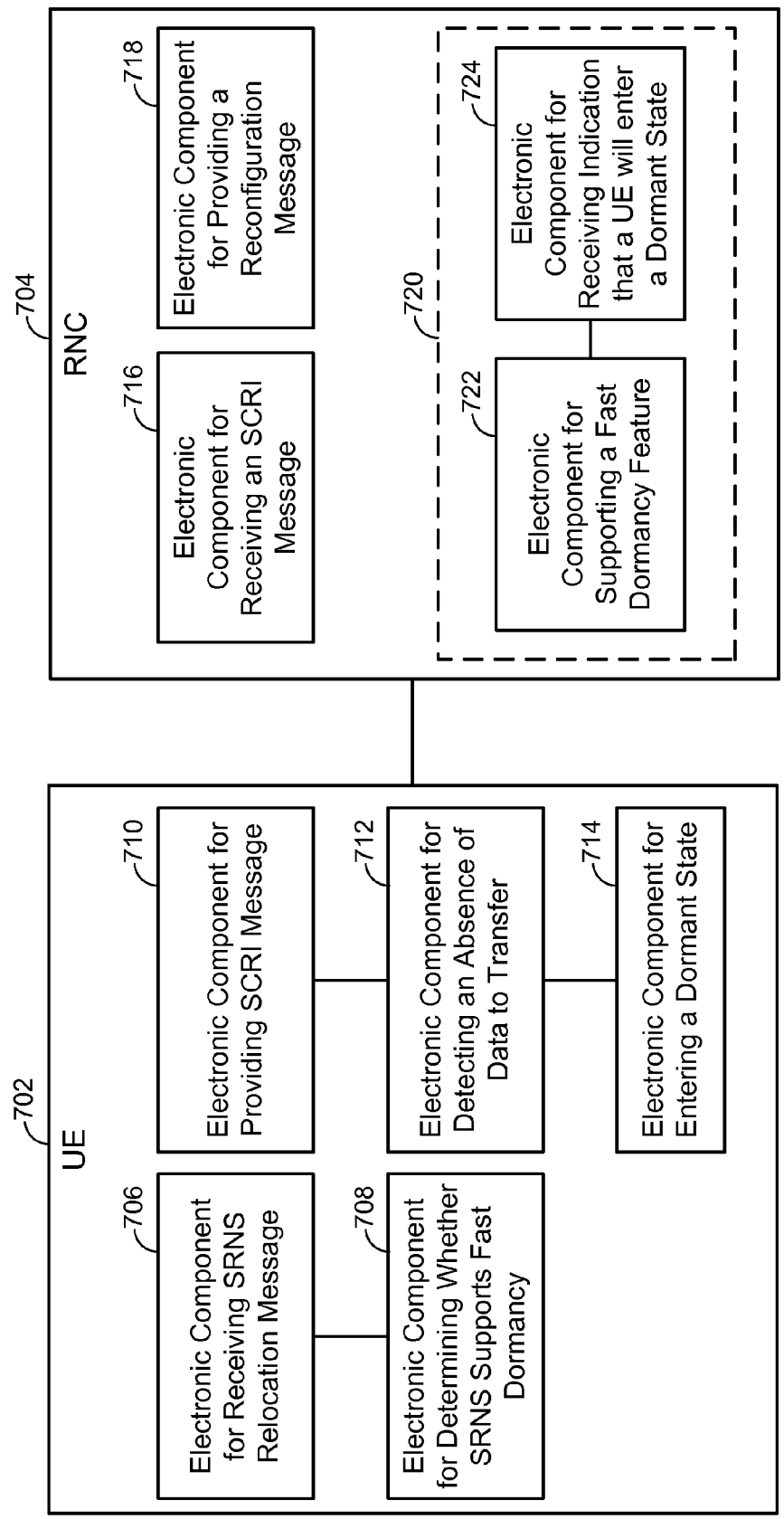
FIG. 7 is a functional block diagram conceptually illustrating example blocks executed to implement the functional characteristics of one aspect of the present disclosure.

FIG. 7 is a conceptual block diagram of a UE 702 and an RNC 704 according to an aspect of the instant disclosure. Here, the UE 702 and the RNC 704 each includes various electronic components for performing certain functions. For example, the UE 702 includes an electronic component 706 for receiving an SRNS relocation message, e.g., from a source RNC and an electronic component 708 for determining whether an SRNS, e.g., the target SRNS to which the UE 702 has been instructed to relocate, supports a fast dormancy feature. The UE 702 further includes an electronic component 710 for providing an SCRI message, e.g., including an indication that the UE will enter a dormant state; an electronic component 712 for detecting an absence of data to transfer to an RNC; and an electronic component 714 for entering a dormant state. The RNC 704 includes an electronic component 716 for receiving an SCRI message from a UE and an electronic component 718 for providing a reconfiguration message to a UE. Optionally, the RNC 704 may further include electronic components within the dashed box 720. That is, the RNC 704 may include an electronic component 722 for supporting a fast dormancy feature and an electronic component 724 for receiving an indication that a UE with which it has a connection will enter a dormant state.

Several aspects of a telecommunications system have been presented with reference to a W-CDMA system. As those skilled in the art will readily appreciate, various aspects described throughout this disclosure may be extended to other telecommunication systems, network architectures and communication standards. By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using computer software, various electrical components such as electronic hardware, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

In one or more aspects of the disclosure, the functions described may be implemented in hardware, software, firmware, or any combination thereof. If implemented in software, the functions may be stored on or transmitted over as one or more instructions or code on a computer-readable medium. Computer-readable media may be transitory or non-transitory, and may include both computer storage media and communication media including any medium that facilitates transfer of a computer program from one place to another. Storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are transitory entities included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Computer-readable media may be embodied in a computer-program product. By way of example, but without limitation, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
 receiving a notification to relocate user equipment from a source serving radio network subsystem (SRNS) to a target SRNS;
 determining whether a target radio network controller (RNC) corresponding to the target SRNS supports a fast dormancy feature based upon information received by the user equipment in a reconfiguration message from the source SNRS; and
 entering a dormant state.

2. The method of claim 1, further comprising:
 providing an indication to the target RNC that a dormant state will be entered.

3. The method of claim 2, wherein the indication to the target RNC is provided in a signaling connection release indication message.

4. The method of claim 1, wherein the determining of whether the target RNC corresponding to the target SRNS supports the fast dormancy feature comprises determining whether the reconfiguration message received from the source SRNS includes an indicator for indicating that the target RNC supports the fast dormancy feature.

5. The method of claim 1, wherein the determining of whether the target RNC corresponding to the target SRNS supports the fast dormancy feature comprises determining whether the reconfiguration message received from the source SRNS includes an information element corresponding to a dormancy timer.

6. The method of claim 1, further comprising:
 detecting an absence of data to transfer from the user equipment; and
 triggering the dormant state in the user equipment responsive to the absence of data to transfer.

7. The method of claim 1, wherein the determining whether the target RNC corresponding to the target SRNS supports the fast dormancy feature comprises assuming that the target RNC does not support the fast dormancy feature, the method further comprising:
 disabling the fast dormancy feature.

8. An apparatus for wireless communication, comprising:
 means for receiving a notification to relocate user equipment from a source serving radio network subsystem (SRNS) to a target SRNS;
 means for determining whether a target radio network controller (RNC) corresponding to the target SRNS supports a fast dormancy feature based upon information received by the user equipment in a reconfiguration message from the source SNRS; and
 means for entering a dormant state.

9. The apparatus of claim 8, further comprising:
 means for providing an indication to the target RNC that a dormant state will be entered.

10. The apparatus of claim 9, wherein the indication to the target RNC is provided in a signaling connection release indication message.

11. The apparatus of claim 8, wherein the means for determining whether the target RNC corresponding to the target SRNS supports the fast dormancy feature comprises means for determining whether the reconfiguration message received from the source SRNS includes an indicator for indicating that the target RNC supports the fast dormancy feature.

12. The apparatus of claim 8, wherein the means for determining whether the target RNC corresponding to the target SRNS supports the fast dormancy feature comprises means for determining whether the reconfiguration message received from the source SRNS includes an information element corresponding to a dormancy timer.

13. The apparatus of claim 8, further comprising:
 means for detecting an absence of data to transfer from the user equipment; and
 means for triggering the dormant state in the user equipment responsive to the absence of data to transfer.

14. The apparatus of claim 8, wherein the means for determining whether the target RNC corresponding to the target SRNS supports the fast dormancy feature comprises means for assuming that the target RNC does not support the fast dormancy feature, the apparatus further comprising:
 means for disabling the fast dormancy feature.

15. A non-transitory computer program product, comprising:
 a computer-readable medium comprising code for:
  receiving a notification to relocate user equipment from a source serving radio network subsystem (SRNS) to a target SRNS;
  determining whether a target radio network controller (RNC) corresponding to the target SRNS supports a fast dormancy feature based upon information received by the user equipment in a reconfiguration message from the source SNRS; and
  entering a dormant state.

16. The non-transitory computer program product of claim 15, wherein the computer-readable medium further comprises code for providing an indication to the target RNC that a dormant state will be entered.

17. The non-transitory computer program product of claim 16, wherein the indication to the target RNC is provided in a signaling connection release indication message.

18. The non-transitory computer program product of claim 15, wherein the code for determining whether the target RNC corresponding to the target SRNS supports the fast dormancy feature comprises code for determining whether the reconfiguration message received from the source SRNS includes an indicator for indicating that the target RNC supports the fast dormancy feature.

19. The non-transitory computer program product of claim 15, wherein the code for determining whether the target RNC corresponding to the target SRNS supports the fast dormancy feature comprises code for determining whether the reconfiguration message received from the source SRNS includes an information element corresponding to a dormancy timer.

20. The non-transitory computer program product of claim 15, wherein the computer-readable medium further comprises code for:
 detecting an absence of data to transfer from the user equipment; and
 triggering the dormant state in the user equipment responsive to the absence of data to transfer.

21. The non-transitory computer program product of claim 15, wherein the code for determining whether the target RNC corresponding to the target SRNS supports the fast dormancy feature comprises code for assuming that the target RNC does not support the fast dormancy feature, wherein the computer-readable medium further comprises code for disabling the fast dormancy feature.

22. An apparatus for wireless communication, comprising:
at least one processor; and
a memory coupled to the at least one processor,
wherein the at least one processor is configured to:
- receive a notification to relocate user equipment from a source serving radio network subsystem (SRNS) to a target SRNS;
- determine whether a target radio network controller (RNC) corresponding to the target SRNS supports a fast dormancy feature based upon information received by the user equipment in a reconfiguration message from the source SNRS; and
- enter a dormant state.

23. The apparatus of claim 22, wherein the at least one processor is further configured to provide an indication to the target RNC that a dormant state will be entered.

24. The apparatus of claim 23, wherein the indication to the target RNC is provided in a signaling connection release indication message.

25. The apparatus of claim 22, wherein the determining of whether the target RNC corresponding to the target SRNS supports the fast dormancy feature comprises determining whether the reconfiguration message received from the source SRNS includes an indicator for indicating that the target RNC supports the fast dormancy feature.

26. The apparatus of claim 22, wherein the determining of whether the target RNC corresponding to the target SRNS supports the fast dormancy feature comprises determining whether the reconfiguration message received from the source SRNS includes an information element corresponding to a dormancy timer.

27. The apparatus of claim 22, wherein the at least one processor is further configured to:
- detect an absence of data to transfer from the user equipment; and
- trigger the dormant state in the user equipment responsive to the absence of data to transfer.

28. The apparatus of claim 22, wherein the determining whether the target RNC corresponding to the target SRNS supports the fast dormancy feature comprises assuming that the target RNC does not support the fast dormancy feature, wherein the processor is further configured to disable the fast dormancy feature.

* * * * *